United States Patent
Seri et al.

[11] Patent Number: 6,081,097
[45] Date of Patent: Jun. 27, 2000

[54] METHOD FOR CHARGING LITHIUM SECONDARY BATTERY

[75] Inventors: Hajime Seri, Izumiotsu; Yoshinori Yamada, Tondabayashi; Kenichi Takeyama, Osaka, all of Japan

[73] Assignee: Matsushita Electric Industrial Co., Ltd., Osaka-fu, Japan

[21] Appl. No.: 09/232,323

[22] Filed: Jan. 18, 1999

[30] Foreign Application Priority Data

Jan. 19, 1998 [JP] Japan .................................. 10-007287
Jul. 8, 1998 [JP] Japan .................................. 10-192540
Jul. 14, 1998 [JP] Japan .................................. 10-198509

[51] Int. Cl.$^7$ ...................................................... H02J 7/00
[52] U.S. Cl. .......................... 320/128; 320/132; 324/430
[58] Field of Search ..................................... 320/124, 125, 320/128, 132, 134, 135, 136, 160; 324/430, 433

[56] References Cited

U.S. PATENT DOCUMENTS 5,576,608  11/1996  Nagai et al. ......................... 320/160 X
5,606,240   2/1997  Kokuga et al. ......................... 320/129
5,637,981   6/1997  Nagai et al. .

FOREIGN PATENT DOCUMENTS 62-082670  4/1987  Japan .

*Primary Examiner*—Edward H. Tso
*Attorney, Agent, or Firm*—Akin, Gump, Strauss, Hauer & Feld, L.L.P

[57] ABSTRACT

A method for charging a secondary battery is disclosed. The method comprises the steps of detecting an impedance of the battery; charging the battery with a substantially constant first current having a value smaller than a predetermined current value if the detected impedance of the battery is equal to or greater than a predetermined impedance value; charging the battery with a substantially constant second current having a value equal to or greater than the predetermined current value if the detected impedance is less than the predetermined impedance value; and terminating charging the battery with the first and second constant currents when the closed circuit voltage of the battery reaches a predetermined voltage value.

7 Claims, 11 Drawing Sheets

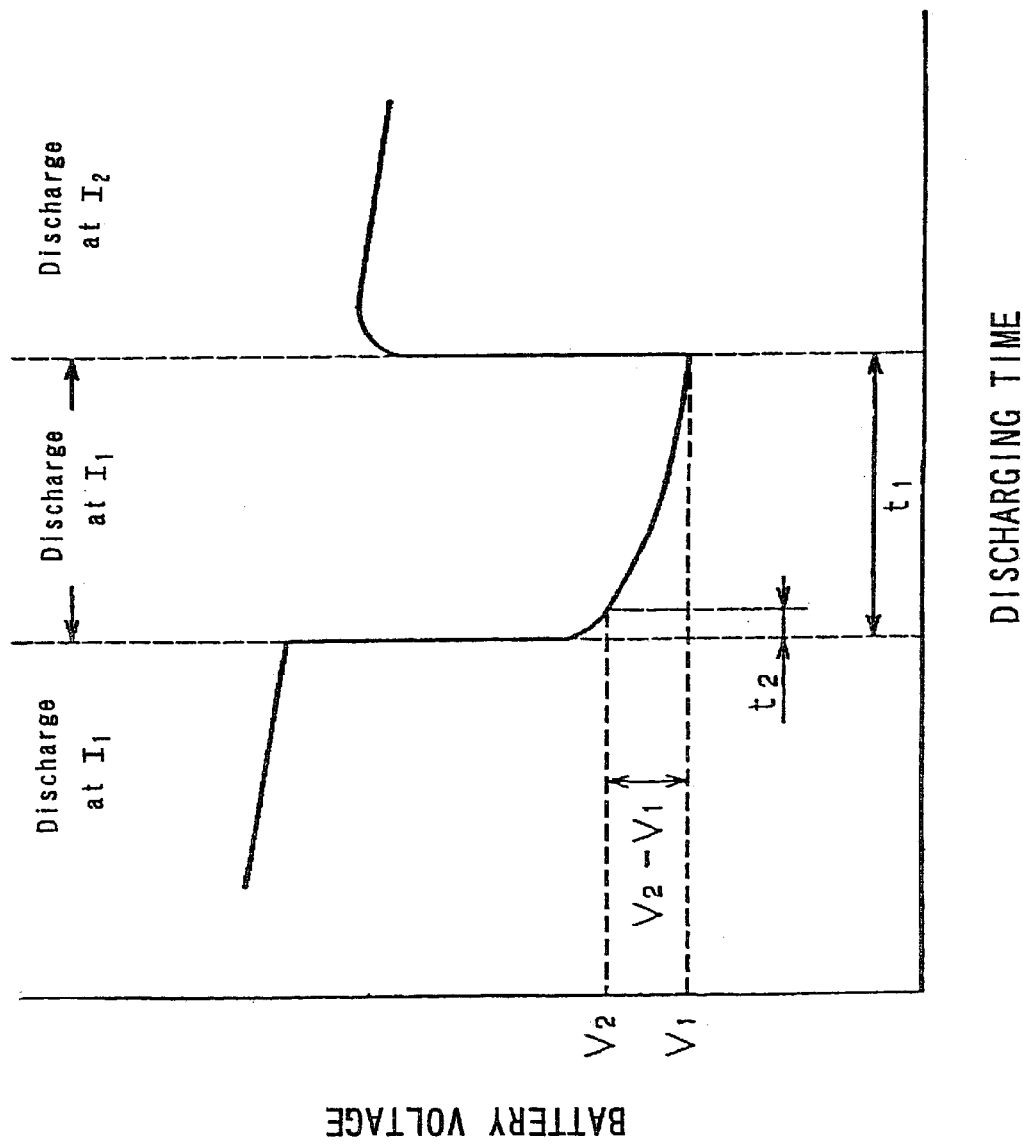

METHOD FOR CHARGING LITHIUM SECONDARY BATTERY

BACKGROUND OF THE INVENTION

The present invention relates to a method for managing charge/discharge operation of secondary batteries, especially to non-aqueous electrolyte secondary batteries.

In recent years, with a popularization of cordless appliances such as portable telephones, lap-top personal computers and the like, demands for higher capacity and higher energy density of the secondary batteries as the power sources of these appliances become more clamorous.

Of the various secondary batteries, non-aqueous electrolyte secondary batteries, represented by lithium ion secondary batteries, are attracting a great deal of attention since these are expected for realizing further higher output voltage and higher energy density. In recent years, the lithium ion secondary batteries with a positive electrode including a complex oxide of lithium and a transition metal, and a negative electrode including a carbon material capable of absorbing and desorbing lithium in a reversible manner are put to practical use.

Normally, the non-aqueous electrolyte secondary batteries are charged up to their fully-charged state and discharged to their exhaustively-discharged state. As proposed in Japanese Unexamined Patent Publications Hei 5-111184, Hei 6-325794 and Hei 7-240235, a so-called constant current-constant voltage charging scheme is widely employed in the method for charging the non-aqueous electrolyte secondary batteries. The disclosed system includes charging a battery at a constant current until the battery voltage reaches a predetermined value and charging it at a constant voltage until the battery is brought to a fully-charged state. A method for detecting the fully-charged state is proposed, for instance, in Japanese Unexamined Patent Publications Hei 6-189466, Hei 7-105980 and Hei 7-235332.

Diagrams in FIG. 1 and FIG. 2 show variance in charging current value and that in charged capacity with time in the constant current-constant voltage charging scheme, respectively. They both represent the case of charging a lithium ion secondary battery with a rated capacity of 700 mAh in conformity with the conventional method, i.e. the constant current-constant voltage charging scheme. As illustrated in the diagrams, the battery was charged at a constant current of 500 mA (hour rate of 0.7 C, where C is the ampere hour rating of the battery) until a closed circuit voltage of the battery reaches 4.1 V at first, then charged at a constant voltage of 4.1 V. The charging was completed when the total charging period reached 2 hours.

As shown in FIG. 1, the charging current value decreases gradually with the time during the constant-voltage charge period. In particular, at a highly charged state which exceeds 90% of the rated capacity, the charging current value is very small, and as shown in FIG. 2. the charging rate is very small accordingly. As illustrated, a long time period is required for bringing the secondary battery to the fully-charged state in the constant current-constant voltage charging scheme.

In order to shorten the charging time in such charging scheme, increasing the current value during the constant-current charge period may be considered. However, according to such procedure, the charging time is hardly shortened, because the degree of decreasing in the charging current value during the constant-voltage charge period is large. On the other hand, if the voltage value during the constant-voltage charge period is made large, a decomposition reaction of an electrolyte in the battery is promoted and the cycle life of the battery is extremely shortened.

Accordingly, a rapid charging method capable of charging the non-aqueous electrolyte secondary battery in a short time as in the case of alkaline electrolyte secondary batteries had not hence been established.

The object of the present invention is to solve the above-mentioned problems and to provide a method for managing a charge/discharge operation of a secondary battery capable of charging a secondary battery, in particular, a non-aqueous electrolyte secondary battery, in a short time, as well as of improving its cycle life.

BRIEF SUMMARY OF THE INVENTION

The method for managing the charge/discharge operation of secondary battery in accordance with the present invention comprises at least one step of:

charging a secondary battery at a constant current until a closed circuit voltage of the battery reaches a predetermined voltage value, or charging the secondary battery at the predetermined voltage value;

wherein, the charging of the secondary battery is terminated before the secondary battery reaches a fully-charged state thereof.

For instance, the secondary battery is first charged by a constant-current charging at a predetermined current value of not less than 1 C (one hour rate). When a closed circuit voltage of the secondary battery reaches a predetermined voltage value, the secondary battery is charged by a constant-voltage charging at a voltage lower than the predetermined voltage value. When the charged capacity of the secondary battery reaches a predetermined value not more than 90% of the rated capacity, the charging is terminated.

According to the constant current-constant voltage charging scheme, the charging current value gradually decreases when the scheme enters into the constant-voltage charging mode. During the constant-voltage charging mode, an increasing rate of the charged capacity therefore decreases with time. Accordingly, the charging can be terminated before the charged capacity reaches the rated capacity when the charging is controlled based on the detected value of a charging current, variance rate with time of the charging current, or the variance rate with time of the charged capacity. Herein, the rated capacity of a battery is defined as a capacity in a case of charging the battery by the conventional charging scheme. That means discharge capacity of fully-charged battery.

Further, by simply performing by timer control means, it is also possible to terminate the charging before the charged capacity reaches the rated capacity. In that case, a timing of actuating the timer may be either of the start of the constant current charge or the start of the constant-voltage charge.

In the case of lithium-ion secondary battery, the battery is preferably charged at the charging rate not less than 1 C up to the voltage value of not less than 4.1 V in the constant-current charge. The lithium ion secondary battery is then charged at a constant voltage of not more than this voltage value until the charged capacity of the battery reaches 90% of the rated capacity.

According to this charge/discharge management method, it is possible to charge a secondary battery in a short time period. Further, in the above-mentioned constant current-constant voltage charging scheme in particular, the secondary battery can be prevented from being subjected to a state of high charging voltage when the initial charged capacity of the battery is low. Therefore, the decomposition of the electrolyte is suppressed and the cycle life characteristic of the battery is improved.

In a preferred mode of the present invention, impedance of the secondary battery is detected during the constant-current charge period. When the detected impedance equals a predetermined value or larger, the constant-current charge is continued at a current value smaller than a predetermined value (for instance, 1 C). When the detected impedance is smaller than the predetermined value, the constant current charge is continued at a current value of the predetermined value or larger.

In the non-aqueous electrolyte secondary battery such as lithium ion secondary battery, internal impedance of the battery is large if the charged state is very low (the charged capacity is not more than 10% of the rated capacity). By measuring the impedance of the secondary battery and plotting the measurement values, a real part-imaginary part diagram of the impedance as shown in FIG. 10 is obtained.

In the diagram of FIG. 10, an arc is apparent in a low frequency region from 10 Hz to 0.1 Hz. In the case of a secondary battery whose charged state is not more than 10% of the rated capacity, this arc is large. The radius of the arc represents a resistance value of an equivalent circuit. The resistance value means, in electrochemical point of view, a charge transition resistance generated at the interface between the electrode active material and the electrolyte.

In the non-aqueous electrolyte secondary batteries in general, the equivalent circuit resistance value varies in compliance with the charged state of the battery, and the value has a tendency of decreasing with the progress of the charging. In a case of the charged capacity being 10% or less to the rated capacity, the reaction resistance (resistivity against the electrode reaction) is large. If an attempt of charging is made on such a region with a large reaction resistance, a side reaction other than the normal charging reaction occurs at the interface between the electrode and the electrolyte, thereby to produce a cause for a deterioration in the battery performance. For that reason, it is preferable to charge the secondary battery before the battery is brought into an exhaustively-discharged state and not to utilize such region. By this measure, it becomes possible to suppress the deterioration in the battery performance. However, there may arise a case wherein a satisfactory battery capacity cannot be secured unless such region is utilized. Accordingly, by making the charging rate small in the region with a large reaction resistance and by making the charging rate large when the resistance against the electrode reaction becomes small, shortening of the charging time period is realized without deteriorating the cycle life characteristic of the battery.

In a strict sense, the equivalent circuit resistance value or the radius of the arc is effective for the control. The resistance value is generally calculated by fitting a circle on the arc of the plotted impedance measurement values and by calculating the radius of the circle based on the intersections of the fitted circle and the real number axis. At that time, it is needless to say that the larger the number of the plotted measurement points, the higher the reliability of the obtained result. However, according to the present invention, the real resistance value can be substituted by the impedance value obtained by a measurement on one point in a low frequency region or around 0.1 Hz. In the actual procedure, impedance of the battery is measured with a certain interval, and the charging rate is increased when the obtained impedance value or the variance thereof from that of the last measurement decreases to or smaller than the predetermined value, for example. It is also possible to increase the charging rate when the variance rate in battery voltage with time while detecting the battery voltage.

It is further effective to correct the obtained impedance value with the temperature at the measurement.

In the present invention, there is no need for employing a specific measurement method and measurement apparatus in the impedance. For instance, any of the AC bridge method (Akira FUJISHIMA "Electrochemistry Measurement Method" p. 216, GIHOHDO Publishing (1984)), the current (voltage)-phase detection method (Akira FUJISHIMA "Electrochemistry Measurement Method" p. 217, GIHOHDO Publishing (1984)) and the white noise inputted FET analyzing method ("Electrochemistry Measurement Method" p 51. Japan Electrochemical Society (1988)) may be employed. However, in order to measure impedance of a battery under the constant-current charge, superimposing a minute AC current on the current of the constant-current charge while utilizing the latter as a bias current for the former and measuring the impedance by means of the previously-described voltage-phase detection Method.

In a preferred mode of the present invention, a secondary battery is discharged while being measured the closed circuit voltage thereof, and the discharging is terminated when the closed circuit voltage or the variance rate with time thereof becomes not more than a predetermined value.

In another preferred mode of the present invention, a secondary battery is discharged at a given current value and the current value is temporarily varied. Then, the discharging is terminated when a difference($|V_1-V_2|$) between a voltage value $V_1$ after a lapse of time $t_1$ from the variance in the current value and another voltage value $V_2$ after another lapse of time $t_2$ becomes not less than a predetermined value.

In order to avoid the use of the region with a large reaction resistance, the discharging should be terminated before the reaction resistance becomes large. As a method therefor, a simple and convenient one is that of detecting the battery voltage during the discharging of the secondary battery and of terminating the discharging when the detected voltage value is smaller than a predetermined value. It is also possible to terminate the discharge when the variance in the voltage value with time is not less than a predetermined value Alternatively, during the discharge period of the battery, a discharge at a different current value is inserted for a short time and the battery voltage in that short discharge period is measured. At that time, since a behavior of the battery voltage excluding a voltage variance portion due to an IR drop is influenced by the previously-described reaction resistance, if the reaction resistance becomes large, the variance in battery voltage becomes large accordingly. However, since it is difficult to detect the voltage variance due to the IR drop itself, there is no problem if the voltage variance due to the discharging for a very short time is employed as a substitute for the voltage variance due to the IR drop.

Accordingly, as shown by the diagram in FIG. 11, during the discharging at a current $I_1$. a discharging at a current $I_2$ which is different from $I_1$ is inserted thereto for a time $t_1$, and when a difference in battery voltage of ($V_2 - V_1$), where $V_2$ being a battery voltage a time $t_2$ after the start of the discharging at the current $I_2$ and $V_1$ being a battery voltage a time $t_1$ after the starts becomes equal to a predetermined value or less, the discharging can well be terminated. Intentional inserting of the short time discharging at the current $I_2$ different from the current $I_1$ is not necessarily required, for instance, in the case of personal computer or the like. This is because a large current is drawn at the time of accessing a hard disk unit, and the voltage behavior at that time can be substituted for the above voltage difference.

In another preferred mode of the present invention, the discharging of the secondary battery is terminated before the battery discharges the electric quantity corresponding to the charged quantity at the last charging. With this measure, it is possible not to use the region where the reaction resistance is large.

In a still other preferred mode of the present invention, the constant-current charge period is terminated before the closed circuit voltage reaches the decomposition voltage of the electrolyte of the battery.

Since the lithium ion secondary battery currently employs the constant current-constant voltage charging scheme, the voltage thereof is maintained at about 4.2 V for a while after entering into the constant-voltage charge mode. However, when the decomposition voltage of the electrolyte in the lithium ion secondary battery is 4.2 V or less, a decomposition reaction of the electrolyte occurs during the constant-voltage charge period and becomes a factor for the deterioration in the capacity accompanied by the repetition of the charge/discharge cycle. Therefore, unless a region where the charged capacity shares a certain rate for the rated capacity, further excellent cycle life characteristic can be obtained.

In the charge control, there may be exemplified a method of terminating the charging when the absolute value of a variance rate with time of a current supplied to a secondary battery becomes smaller than a predetermined value while detecting the variance rate. A method of terminating the charging at a previously set time can also be possible.

In a still further preferred mode of the present invention, the charging current value is varied temporally during the constant-current charge period, and the current value in the constant-current charging is made larger when a difference ($|V_1-V_2|$) between a voltage value $V_1$ after a lapse of time $t_1$ from the start of the charging at the varied current value and another voltage value $V_2$ after another lapse of time $t_2$ becomes smaller than a predetermined value.

In a still other preferred mode of the present invention, a temporal change in charging current value is repeated at a predetermined interval during the constant-current charge period and the current value of a constant-current charging is made larger when a difference ($|V_1-V_2|$) between a voltage value $V_1$ after a lapse of time $t_1$ from the start of the charging at this changed current value and another voltage value $V_2$ after another lapse of time $t_2$ becomes small by not less than a predetermined value.

Charging rate can be changed based on a detected behavior of battery voltage during the charging with an inserted short time charging at a different current value or short time quiescence for every given time. The behavior includes a change in battery voltage excluding a variance due to an IR drop, that between the present short time charging or quiescence. Since the behavior of the battery voltage excluding the variance due to the IR drop is considered to be influenced by the previously-described reaction resistance, the variance in the battery voltage is also large if the reaction resistance is large. Accordingly, the charging rate may well be made large when the variance in the battery voltage or a difference with the previous variance becomes not more than a predetermined value.

The non-aqueous electrolyte secondary battery employed in the above is preferable to configured with a positive electrode active material comprising a complex oxide of lithium and a transition metal, and a negative electrode active material comprising a carbon material capable of absorbing and desorbing lithium in a reversible manner.

In the above-mentioned charging method, it is desirable to start the constant-current charge period from a charged state of not less than 10% of the rated capacity of the above-mentioned battery.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 11 is a characteristic diagram showing a behavior of a battery voltage accompanied with a change in discharge current.

DETAILED DESCRIPTION OF THE INVENTION

Figure 1:
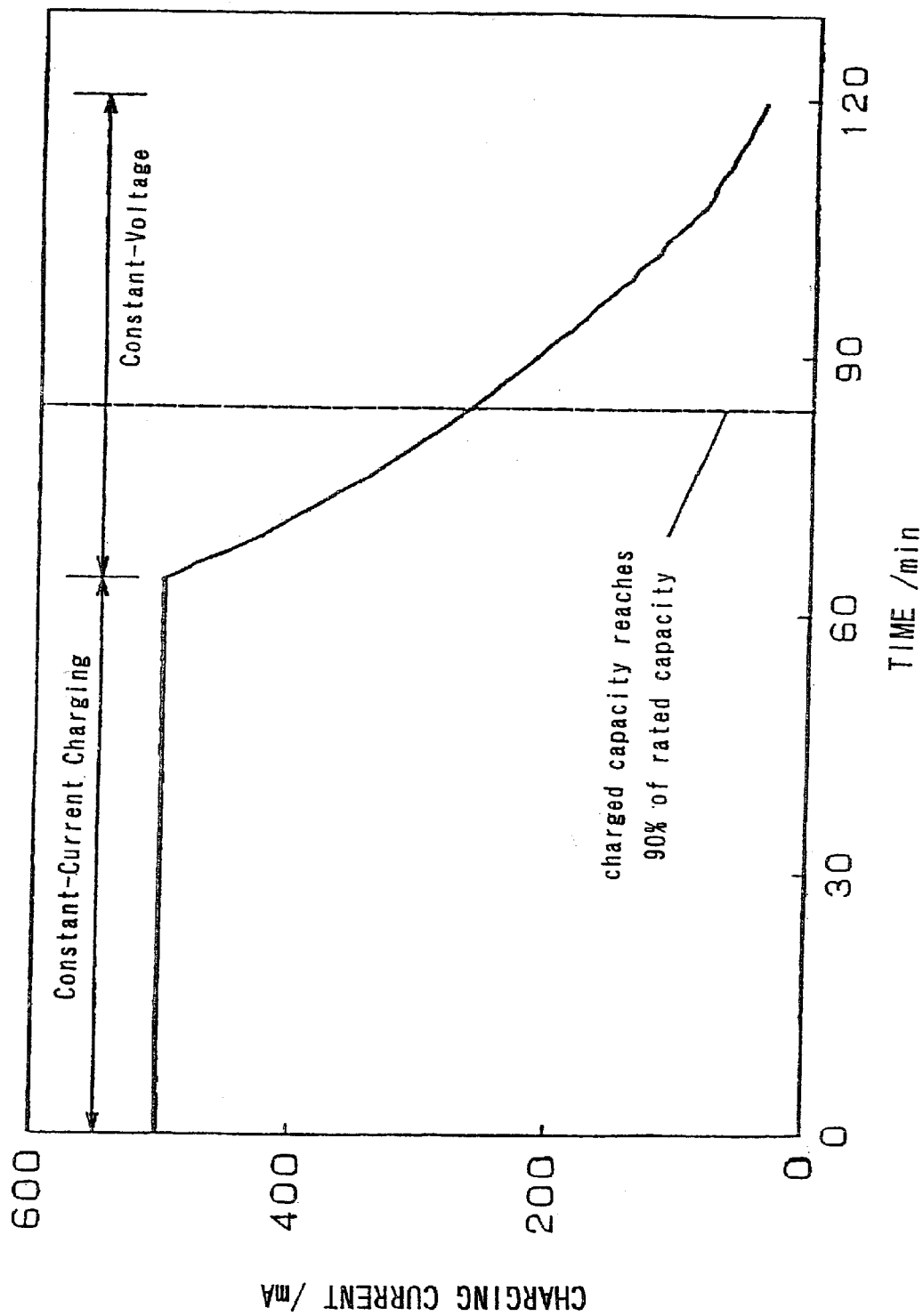
FIG. 1 is a diagram showing a behavior of a charging current value when a constant current-constant voltage charging scheme is employed for charging a secondary battery.
Figure 2:
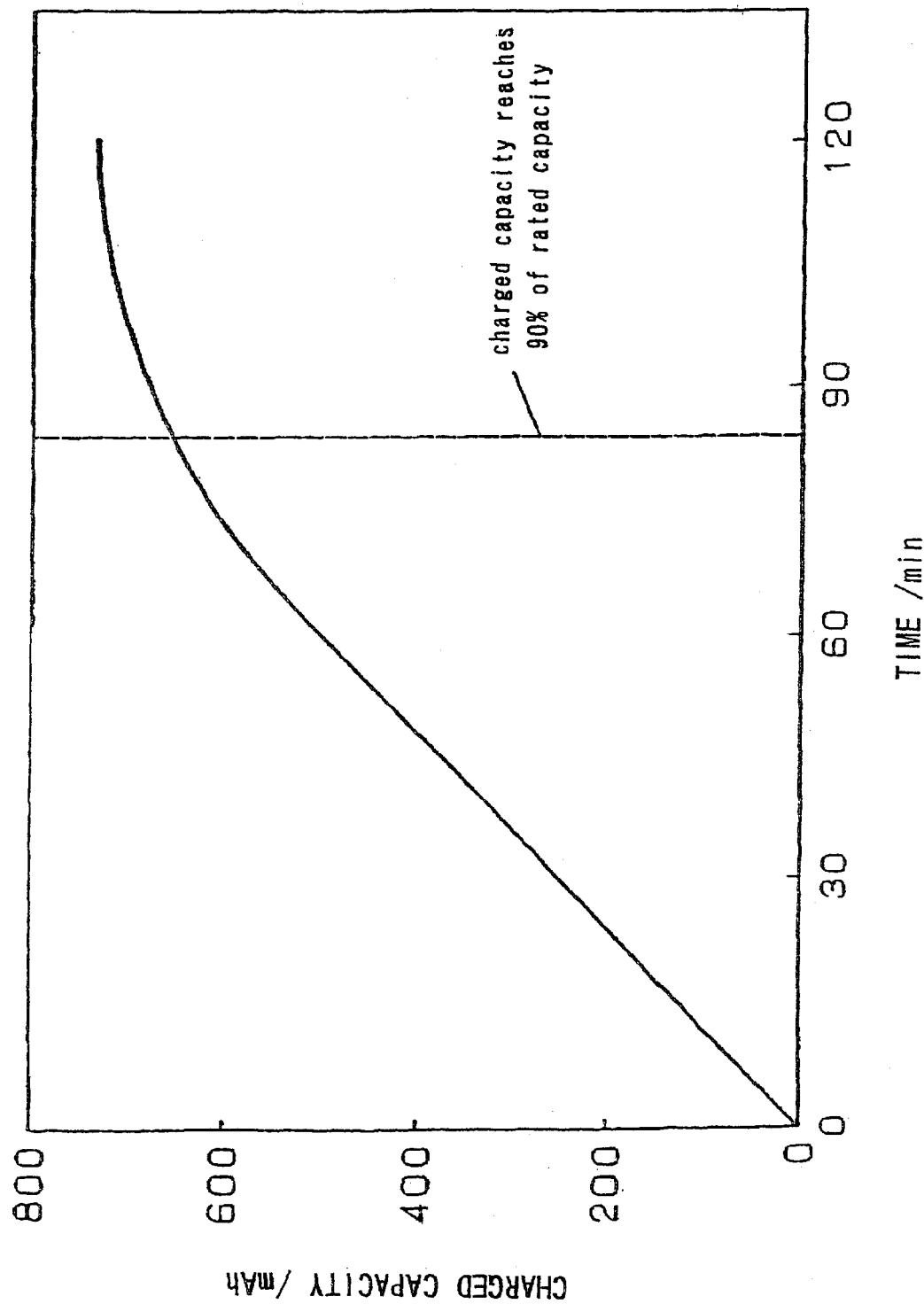
FIG. 2 is a diagram showing a behavior of a charged capacity of the same secondary battery.

In the following paragraphs, preferred examples of the present invention will be described with referred to the attached drawings.

EXAMPLE 1

A cylindrical lithium ion secondary battery was produced in the following manner.

First, a positive electrode mixture was prepared by blending 100 parts by weight of $LiCoO_2$ powder as a positive electrode active material, 3 parts by weight of acetylene black as a conductive agent and 7 parts by weight of a fluorocarbon resin binding agent. Then, a paste was prepared by suspending thus obtained positive electrode mixture in an aqueous solution of carboxymethylcellulose. Next, the obtained paste was painted on an aluminum foil. The painted paste was then dried and roll-pressed, thereby to produce a positive electrode plate having a capacity of 720 mAh.

Separately, a negative electrode mixture was prepared by mixing 100 parts by weight of graphite powder, 4 parts by weight of styrene-butadiene rubber. Then a paste was prepared by suspending thus obtained negative electrode mixture in an aqueous solution of carboxymethylcellulose. Next, the obtained paste was painted on a copper foil, then dried and pressed, thereby to produce a negative electrode plate.

The positive electrode plate and negative electrode plate obtained in the above-mentioned manner were laminated each other with a separator made of a polypropylene porous film interposed therebetween. Then the laminated sheets were wound up together in a spiral fashion, thereby to produce an electrode group. After enclosing thus obtained electrode group in a battery case of A size, a predetermined amount of an electrolyte prepared by dissolving $LiPF_6$ in a mixed solvent of ethylene carbonate and ethyl methyl carbonate was injected into the battery case. An open end of the battery case was then sealed.

The discharge capacity of the battery thus obtained was measured in the conventional charge/discharge method. The battery was charged at a constant current of 0.7 C (500 mA) at 20° C. until the closed circuit voltage of the battery reaches 4.1 V, and the charging was then switched to a constant-voltage charge 2 hours after the start of the constant-current charging. Subsequently, the battery was discharged at a current of 1 C (720 mA) until the battery voltage dropped to 3.0 V, and the discharge capacity at that time was determined as the battery capacity. The battery capacity obtained at that time was 720 mAh. This value is defined as a rated capacity of the battery.

With the voltage during the constant-voltage charge period of 4.2 V, the cycle life characteristic of the battery in the method for managing the charge/discharge of the present invention was compared with that of the conventional charge/discharge method.

A battery whose charged capacity was 10% of the rated capacity was charged at a constant current of 1 C, and the charging was switched to the constant-voltage charge when the closed circuit voltage of the battery reached 4.2 V. The charging was terminated 50 minutes after the start of the constant-current charging. Subsequently, the battery was discharged until the battery capacity decreased to 10% of the rated capacity. This charge/discharge cycle was repeated. This is named as Sample 1.

Further, a battery whose charged capacity was 10% of the rated capacity was charged at a constant current of 1.2 C (860 mA), and the charging was switched to the constant-voltage charge when the closed circuit voltage of the battery reached 4.2 V. The charging was terminated after 43 minutes-charging. Subsequently, the battery was discharged until the remaining capacity decreased to 10% of the rated capacity. This charge/discharge cycle was repeated. This is named as Sample 2.

As a comparative example, a battery was charged at a constant current of 0.7 C, and the charging was switched to the constant-voltage charge when the closed circuit voltage of the battery reached 4.2 V. The charging was terminated 2 hours after the start of the constant current charging. Subsequently, the battery was discharged until the battery voltage dropped to 3.0 V. This charge/discharge cycle was repeated. This is named as Sample 3 (comparative example).

Figure 3:
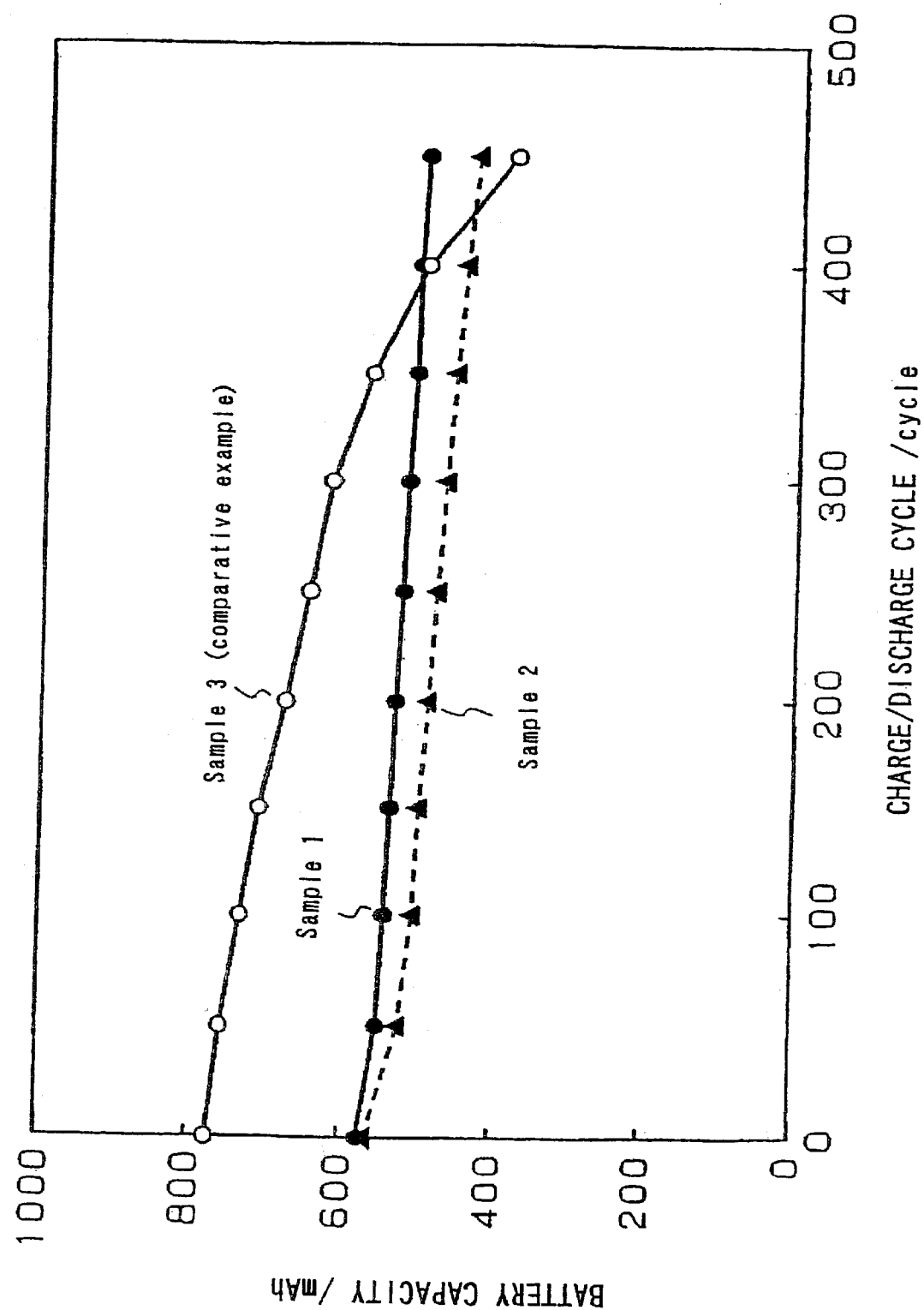
FIG. 3 is a characteristic diagram showing a cycle life characteristic of secondary batteries of an example in the present invention.

A diagram in FIG. 3 shows the cycle life characteristics of the batteries charged in the above-mentioned different charging methods. As shown in this diagram, the battery of Sample 3 which was charged in the conventional charge/discharge method up to the fully-charged state shows larger initial capacity than Sample 1 and Sample 2 which were charged up to only 80% of the rated capacity. the capacity of Sample 3 decreased greatly with the repetition of the charge/discharge cycles and the deterioration in the capacity becomes remarkable when the repetition exceeds about 300th cycle in particular.

In contrast, Sample 1 and Sample 2 hardly decrease in battery capacity even when the charge/discharge cycle was repeated.

As a result, Sample 1 and Sample 2 demonstrated larger capacity than that of Sample 3 after 400th cycle. although these batteries had been charged up to only 80% of the rated capacity.

As described previously, by terminating the charging of a battery before the battery is brought into the fully-charged state, the charging time is shortened in great deal and the cycle life characteristic of the battery is improved as compared with the conventional method.

EXAMPLE 2

A cylindrical lithium ion secondary battery similar to that in Example 1 was produced, and the battery capacity thereof is confirmed to be 720 mAh. This value is defined as the rated capacity.

A battery in the exhaustively-discharged state was charged at a constant current of 0.7 C until the charged capacity of the battery reached 10% of the rated capacity, and the constant-current value was then switched to 1 C and the charging was continued. When the closed circuit voltage of the battery reached 4.2 V, the charging was switched to a constant-voltage charge and completed 52 minutes after the start of the constant-current charging. Subsequently, the battery was discharged until the closed circuit voltage thereof dropped to 3.0 V. This charge/discharge cycle was repeated. This is named as Sample 4.

The battery in the exhaustively-discharged state was charged at a constant current of 0.7 C until the charged capacity of the battery reached 10% of the rated capacity, and the constant-current value was then switched to 1.2 C and the charging was continued. When the closed circuit voltage of the battery reached 4.2 V, the charging was switched to a constant-voltage charge and completed 45 minutes after the start of the constant-current charging. Subsequently, the battery was discharged until the closed circuit voltage thereof dropped to 3.0 V. This charge/discharge cycle was repeated. This is named as Sample 5.

Figure 4:
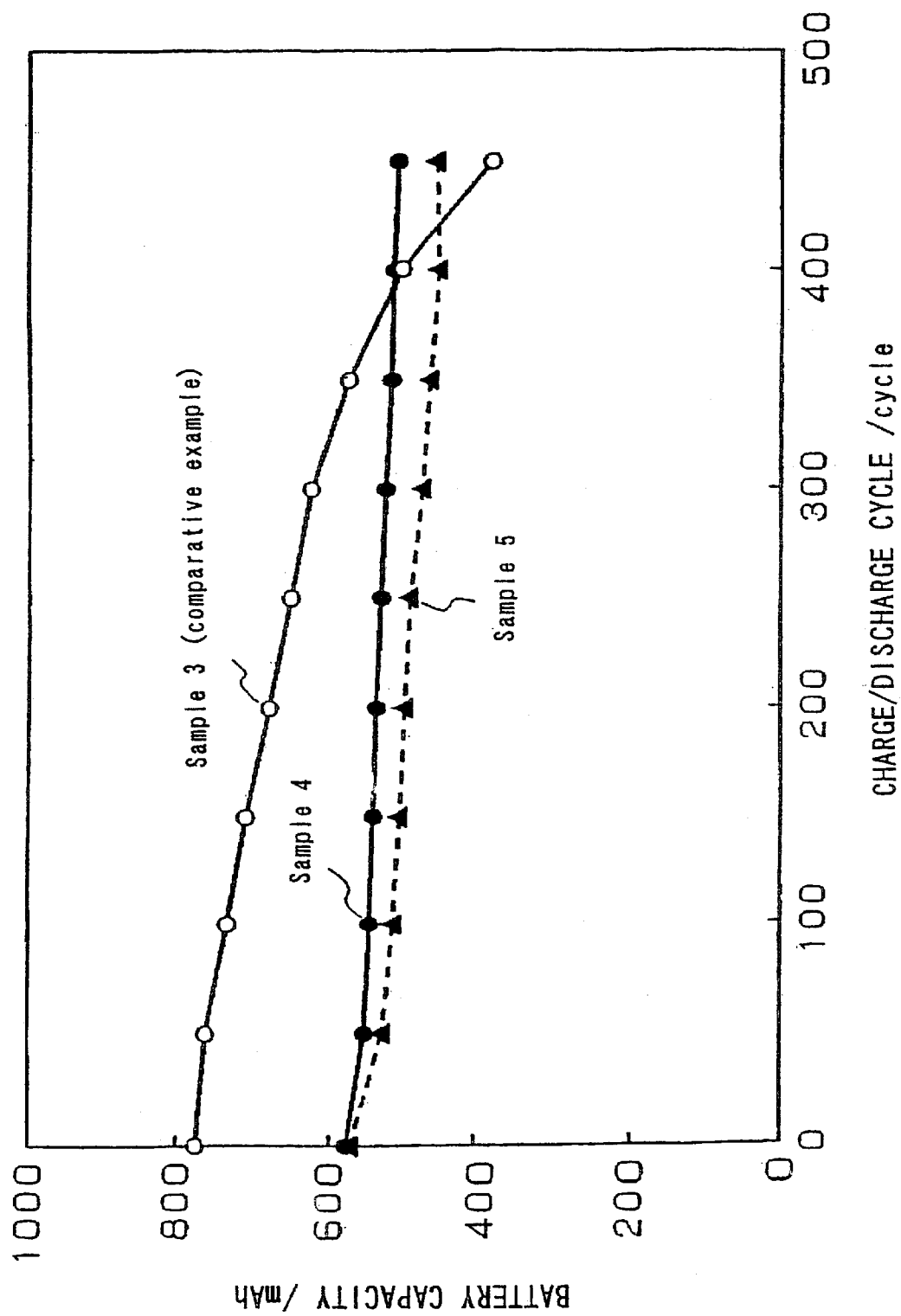
FIG. 4 is a characteristic diagram showing cycle life characteristics of secondary batteries of another example of the present invention.

A diagram in FIG. 4 shows the cycle life characteristics of the batteries of Sample 4 and Sample 5. In this diagram, the cycle life characteristic of the battery of Sample 3, which has been subjected to the charge/discharge in the conventional method, is also shown as Comparative example.

The battery of Sample 3 which had been charged by the conventional charge/discharge method up to the fully-charged state shows larger initial capacity than Sample 4 and Sample 5 which have been charged up to only 80% of the rated capacity. However, the capacity of Sample 3 decreases greatly with the repetition of the charge/discharge cycles and the deterioration in the capacity becomes remarkable when the repetition exceeds about 300 cycles in particular.

In contrast, Sample 3 and Sample 4 hardly decrease in battery capacity even when the charge/discharge cycle was repeated.

As a result, Sample 1 and Sample 2 demonstrated larger capacity than that of Sample 3 after 400th cycle, although these batteries had been charged up to only 80% of the rated capacity.

In addition, an impedance of the battery was measured while superimposing an AC with an amplitude of 50 mA and a frequency of 100 mHz on the DC charging current during the constant-current charge period at 0.7 C (500 mA) from the start of charging. In the constant-current charge period, the charging rate was switched to 1 C or 1.2 C when the measurement value decreased from the initial value to 250 mΩ. When the battery voltage reached 4.2 V, the charging was switched to the constant-voltage charge. In such case, the battery also demonstrated excellent cycle life characteristics similar to those of the above-mentioned Samples 4 and 5.

EXAMPLE 3

A cylindrical lithium ion secondary battery similar to that in Example 1 was produced.

The produced battery was charged at a constant-current of 500 mA at 20° C. until the battery voltage reached 4.2 V. Then the charging was switched to a constant-voltage charge and terminated for 2 hours in total. Subsequently, the battery was discharged at 720 mA until the battery voltage dropped to 3.0 V and the battery capacity was conformed to be 780 mAh. This is defined as the rated capacity.

The cycle life characteristic of thus obtained battery in the charging method of the present invention was compared with that in another case of the conventional charging method.

Incidentally, a decomposition voltage of the electrolyte in this battery is from about 4.0 V to 4.1 V. While considering this matter, the battery was charged at a constant current of 360 mA until the closed circuit voltage thereof reached 4.0 V. Then, the battery was discharged until the closed circuit voltage dropped to 3.0 V. This is named as Sample 6.

Further, while considering the case where the voltage of the battery reaches to the decomposition voltage of the electrolyte, but is not maintained at that voltage, the battery was charged at a constant current of 500 mA until the closed circuit battery voltage reached 4.1 V. Then, it was discharged until the closed circuit voltage dropped to 3.0 V. This is named as Sample 7. Similarly, one that completed a constant current charge at 4.2 V was named as Sample 8.

In contrast to these, one that was charged in the conventional charging method, i.e., charged at a constant-current of 500 mA until the battery voltage reached 4.2 V, then switched to a constant-voltage charging and the charging was continued for 2 hours in total. This is named as Sample 9 (Comparative example).

Figure 5:
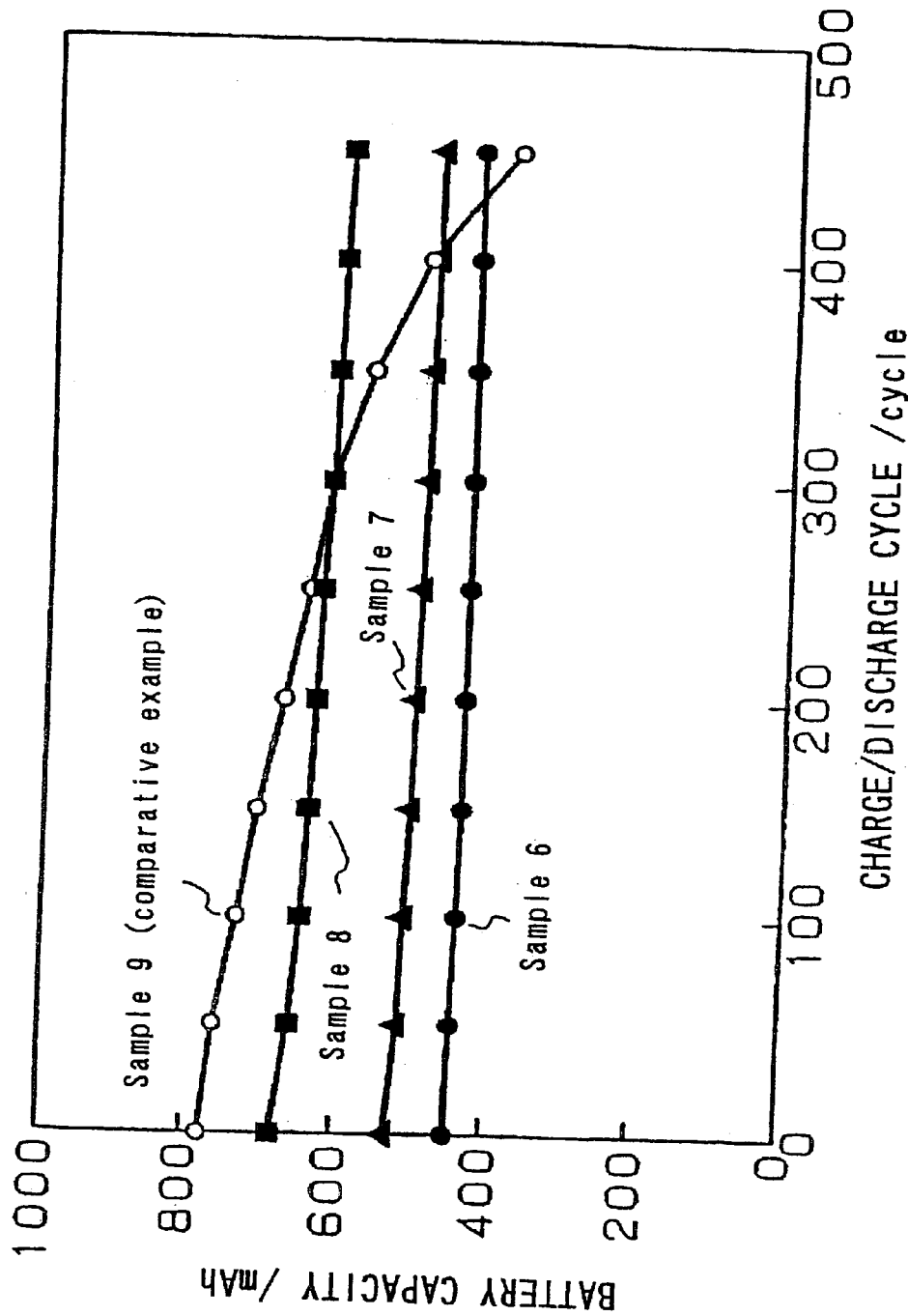
FIG. 5 is a characteristic diagram showing cycle life characteristics of secondary batteries in a still other example of the present invention.

A diagram in FIG. 5 shows the cycle life characteristics of the batteries of Sample 6 through Sample 9.

As shown in this diagram, the batteries of Sample 6 through 8 exhibit smaller charged capacities than that of Sample as the comparative example at an early stage since the charged capacities of these batteries are smaller than the rated capacity. However, these batteries also exhibit small decreases in discharge capacity. Especially, Sample 6, whose charging had been terminated before the battery voltage reached the decomposition voltage of the electrolyte, demonstrates almost no deterioration. After repeating the charge/discharge cycle, the capacities of Sample 6 through 8 become larger than that of Sample 9 as the comparative example.

EXAMPLE 4

A cylindrical lithium ion secondary battery similar to that of Example 3 was produced. Then, a capacity is confirmed to be 780 mAh. This is defined as the rated capacity.

Using thus obtained battery, the cycle life characteristic of the battery in the charging method of the present invention was compared with that in the conventional charging method.

The battery was charged at a constant current of 500 mA and the charging was switched to a constant-voltage charge when the closed circuit voltage of the battery reached 4.2 V. During the constant-voltage charge period, the charged capacity was derived by an accumulation of the charging current value, and a variance rate thereof with time was calculated for every minutes. The charging was terminated when the variance rate became 0.07 mAh/sec or less. This was named as Sample 10. Herein, the variance rate of the charge capacity during the constant-current charge period is constant at 0.14 mAh/sec.

A battery was charged at a constant current of 500 mA, and the charging was switched to a constant-voltage charge when the closed circuit voltage of the battery reached 4.2 V. During this constant-voltage charge period, the charging current quantity was detected and a variance rate thereof with time was calculated. This was named as Sample 11.

During the constant-current charge period, the variance rate with time of the current quantity was of course zero.

Further, a timer had been actuated at the start of the constant-current charge at 500 mA, and the charging was switched to a constant-voltage charge when the closed circuit voltage of the battery reached 4.2 V. Then, the charging was terminated after the charging for 85 minutes in total. This was named as Sample 12.

Thus charged battery was discharged until the voltage dropped to 3.0 V.

Figure 6:
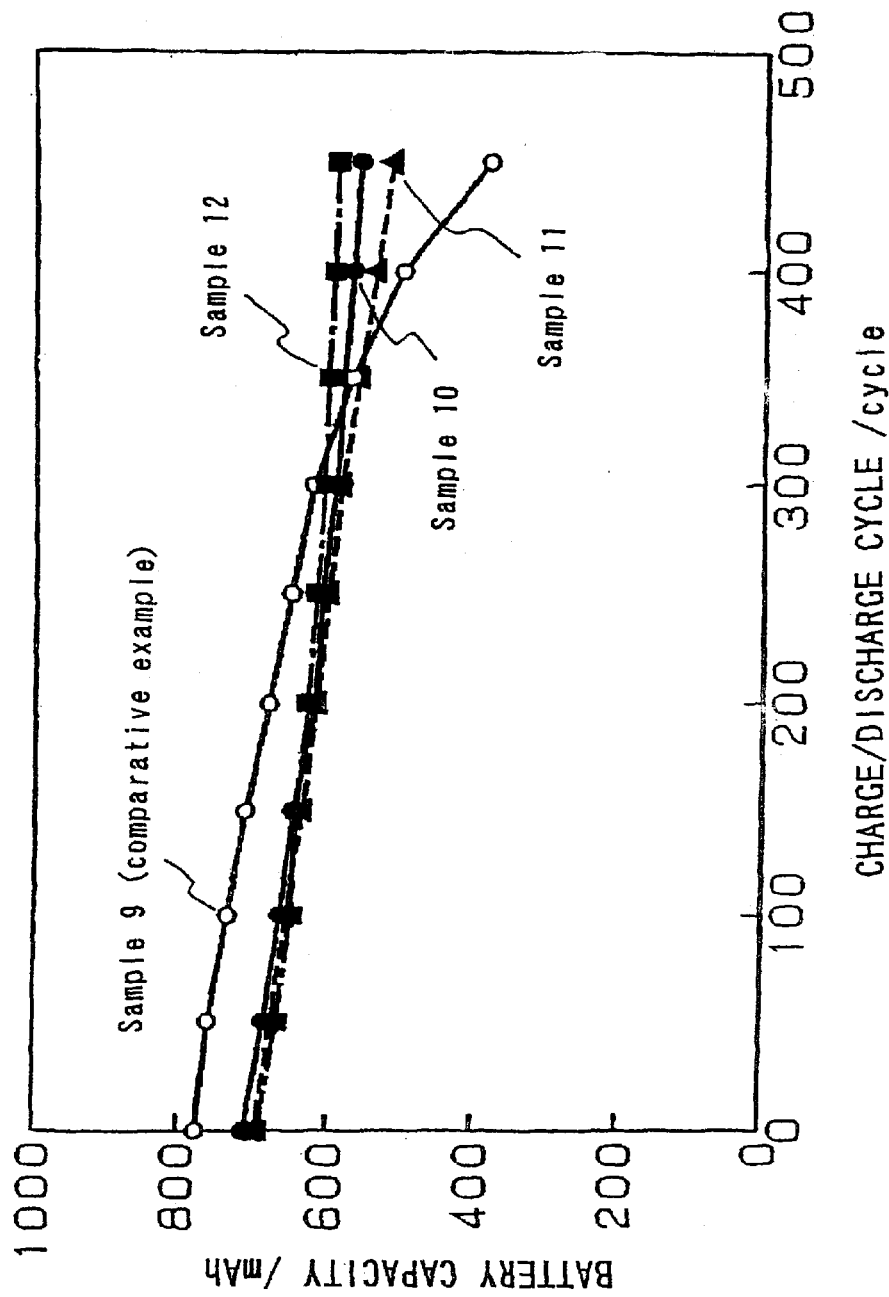
FIG. 6 is a characteristic diagram showing cycle life characteristics of secondary batteries in a still further example of the present invention.

The above charge/discharge cycle was repeated on each of the batteries of Samples 10 through 12. The results thereof are shown in the diagram of FIG. 6. The results on Sample 9 used in Example 3 is also included in this diagram as a comparative example.

As shown in this diagram, the batteries of Samples 6 through 8 exhibit smaller charged capacities than that of Sample 9 as the comparative example at an early stage since the charged capacities of these batteries are smaller than the rated capacity. However, these batteries also exhibit small decreases in discharge capacity. Especially, Sample 6, whose charging had been terminated before the battery voltage reached the decomposition voltage of the electrolyte, demonstrates almost no deterioration. After repeating the charge/discharge cycle, the capacities of Samples 6 through 8 become larger than that of Sample 9 as the comparative example.

EXAMPLE 5

A cylindrical lithium ion secondary battery similar to that of Example 3 was produced. Then, a capacity is confirmed to be 780 mAh. This is defined as the rated capacity.

Using thus obtained battery, the cycle life characteristic of the battery in the charging method of the present invention was compared with that in the conventional charging method.

At the start of charging a battery at a constant-current of 500 mA, a timer was actuated for detecting the variance rate with time of the battery voltage, and when the rate became 0.15 mV/sec or less, the charging current was increased to 800 mA. When the battery voltage reached 4.2 V, the charging was switched to a constant-voltage charge. The charging was terminated after the charging for 58 minutes in total. This was named as Sample 13.

Further, at the start of the constant-current charge of a battery at 500 mA, a timer was actuated for detecting the change in the battery voltage. During the constant-voltage charging, quiescence for 500 msec was inserted in the constant-current charge period for every 10 seconds. The charging current was increased to 800 mA when a difference between the variance in the battery voltage at a given quiescence excluding such portion in the variance due to an IR drop during the quiescence and the variance at the last quiescence became not more than 0.6 mV. The charging was switched to a constant-voltage charge when the battery voltage reached 4.2 V, and was terminated after the charging for 58 minutes in total. This was named as Sample 14.

Thus charged batteries were discharged until the voltage dropped to 3.0 V.

Figure 7:
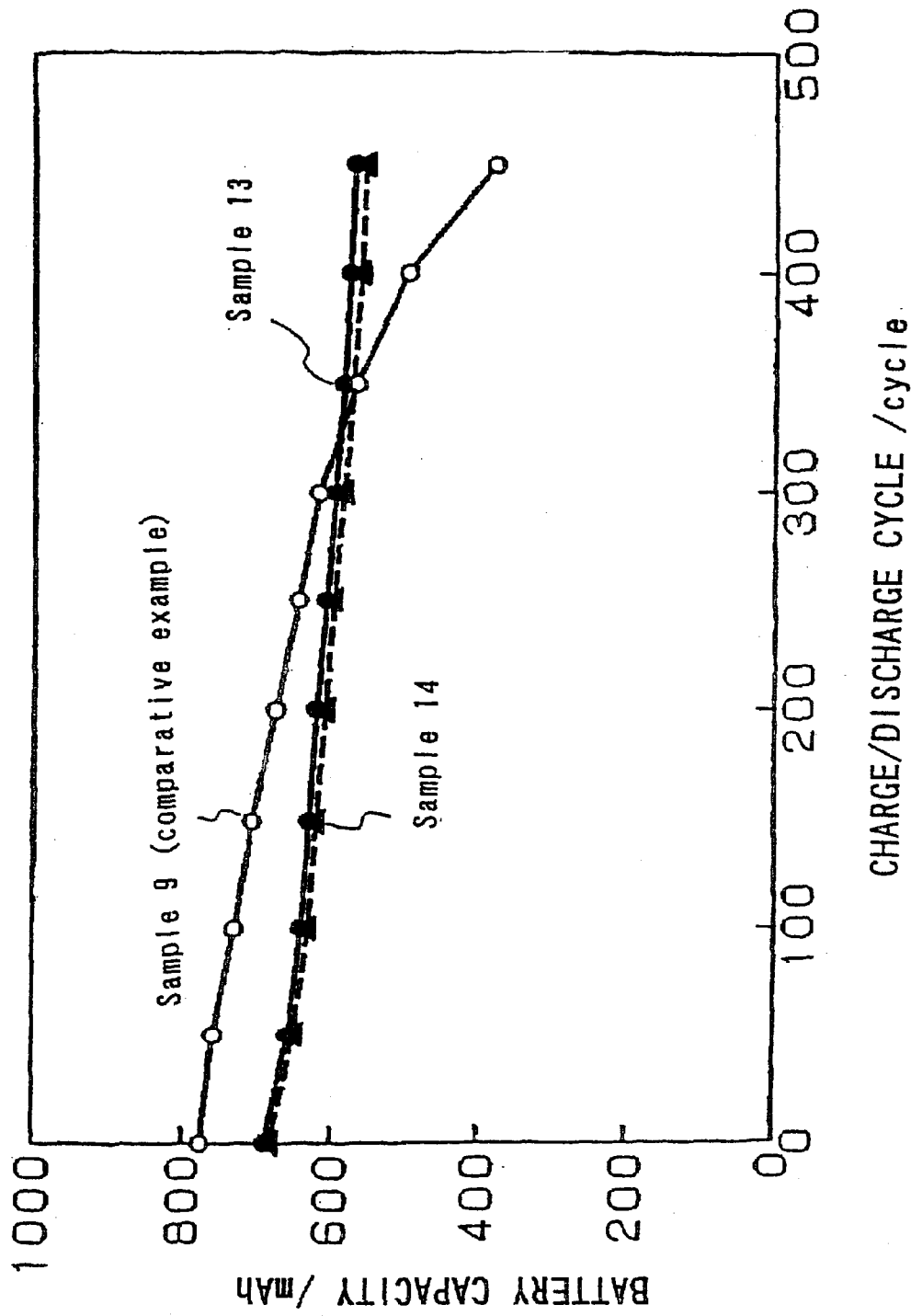
FIG. 7 is a characteristic diagram showing cycle life characteristics of secondary batteries in a still further example of the present invention.

This charge/discharge cycle was repeated on each of the batteries of Samples 13 and 14. The results thereof are shown in the diagram of FIG. 7. The results on Sample 9 used in Example 3 is concurrently included in this diagram as an comparative example.

Sample 13 and Sample 14 as examples exhibit smaller battery capacities than the Sample 9 as the comparative example in an early stage since the charging on these batteries are terminated before reaching the rated capacity. However, they have small deterioration in capacities accompanied by the repetition of the charge/discharge cycle, and the capacities become even larger than that of the comparative example after the further repetition of the charge/discharge cycle.

Further, the charge time period is shortened to 58 minutes in Sample 13 and Sample 14 as contrasted with that of 85 minutes in Sample 12, although the battery capacities in Samples 13 and 14 are almost the same as that of Sample 12 of Example 4.

As described above, according to the method of this example, an excellent cycle life characteristic of battery can be obtained as compared with the conventional method and the shortening of the charge time period is realized as well.

In addition, a similar result was obtained in another case of, for example, while interposing an AC current having an amplitude of 50 mA and a frequency of 100 mHz from the start of the constant-current charge of the battery on a charging current of 500 mA with a predetermined interval and increasing the charging current to 800 mA when a difference between a measured impedance value and that obtained in the last measurement becomes not smaller than the predetermined value, or while interposing a charging current of 800 mA for 500 msec with a predetermined interval from the start of the constant-current charge of the battery on a charging current of 500 mA and increasing the charging curent to 800 mA when a difference between a valiance in the battery voltage in the charging at 800 mA and that in the last 800 mA charging excluding an IR drop in the charging.

EXAMPLE 6

A battery similar to that in Example 1 was charged at a constant current of 500 mA at 20° C. and the charging was switched to a constant-voltage charge when the closed circuit voltage of the battery reached 4.2 V. The charging was terminated when the charge period reached 2 hours in total. Then, the battery was confirmed to have a capacity of 780 mAh by discharging at 720 mA until the voltage dropped to 3.0 V. This was defined as the rated capacity.

Using the above-mentioned battery, a cycle life characteristic of the battery in the charging method in accordance with the present invention was compared with that in the conventional charging method.

As a battery of this example, the battery was charged at a constant current of 500 mA at first, and the charging was switched to a constant-voltage charge when the closed circuit voltage of the battery reached 4.2 V and terminated after the charging for 110 minutes in total. Then, the battery was discharged at a constant current of 360 mA, and the discharging was terminated when the variance rate with time of the battery voltage became 0.2 mV/sec or more. After the discharging, the battery has a remaining capacity of 10% of the rated capacity. This was named as Sample 15.

As an example, discharging at a constant current of 650 mA for 500 msec was interposed on a constant-current discharge at 500 mA with an interval of 10 minutes, and the discharging was terminated when a difference between a battery voltage 500 msec after the start of 650 mA discharge and the battery voltage 10 msec after the start became 25 mV or larger. This was named as Sample 16. In this case, charging was performed on a constant-current of 500 mA at first, switched to a constant-voltage charge after the battery voltage reached to 4.2 V. and terminated after the charging for 110 minutes in order to remain a charged capacity of 10% of the rated capacity after the discharging, This is named Sample 16.

As a comparative example, one was subjected to a repetition of full charge-exhaustive discharge in conformity with the conventional charge/discharge scheme. In the scheme, charging was performed at a constant current of 500 mA and then switched to a constant-voltage charge after the battery voltage reached 4.2 V. for 2 hours in total, and discharge was performed at 360 mA until the battery voltage dropped to 3.0 V. This was named as Sample 17.

Figure 8:
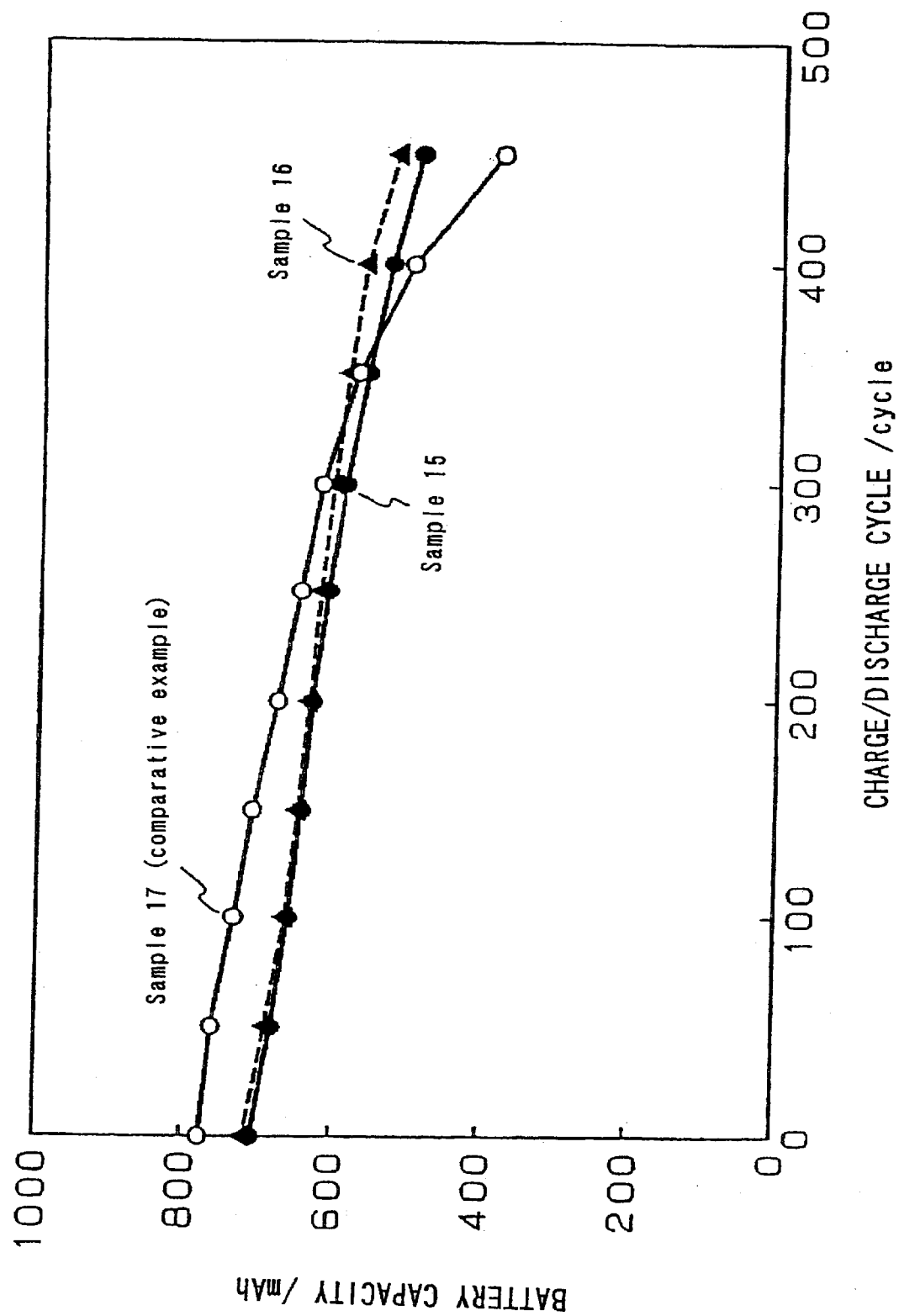
FIG. 8 is a characteristic diagram showing cycle life characteristics of secondary batteries in a still other example of the present invention.

The diagram in FIG. 8 shows cycle life characteristics of the batteries of Samples 15 through 17. The batteries of Samples 15 and 16 in accordance with the method of this example have smaller battery capacities in an early stage of the cycles than that of Sample 17 of the comparative example. This is because the the batteries of samples 15 and 16 do not use their capacity of about 10% equivalent of the rated capacity. However, they hardly deteriorated in the capacities during the repetition of charge/discharge cycle and demonstrate larger capacity than Sample 17 of the comparative example with the further repetition of the charge/discharge cycles.

In addition, a similar technical advantage is obtained by repeating a charge/discharge cycle wherein the discharging is terminated before the discharged capacity reaches the charged capacity, while detecting the charged capacity and the discharged capacity of the battery.

EXAMPLE 7

A cylindrical lithium ion secondary battery was produced in a manner similar to that of Example 6. Then, the battery was confirm to have a capacity of 780 mAh, this was defined as the rated capacity.

Using the above-mentioned battery, a cycle life characteristic of the battery in the managing method in accordance with the present invention was compared with that in the conventional discharging method.

As an example, a discharge was terminated when a variance rate in battery voltage with time becomes 0.2 mV/sec or larger while discharging a battery at a constant current of 360 mA. In this case, the discharging is terminated while the battery remaining a discharge capacity of 10% of the rated capacity. In the charging, charging of the battery was performed at a constant current of 500 mA at first, switched to a constant-voltage charging when the battery voltage reached 4.2 V, and terminated after the charging for 70 minutes in total. In this manner, the battery was prevented from being charged 90% or more to the rated capacity. This is named Sample 18.

As a comparative example, one was subjected to a repetition of full charge-exhaustive discharge in conformity with the conventional charge/discharge scheme. In the scheme, charging was performed at a constant current of 500 mA and then switched to a constant-voltage charge after the battery voltage reached 4.2 V, for 2 hours in total, and discharge was performed at 360 mA until the battery voltage dropped to 3.0 V. This was named as Sample 19.

Figure 9:
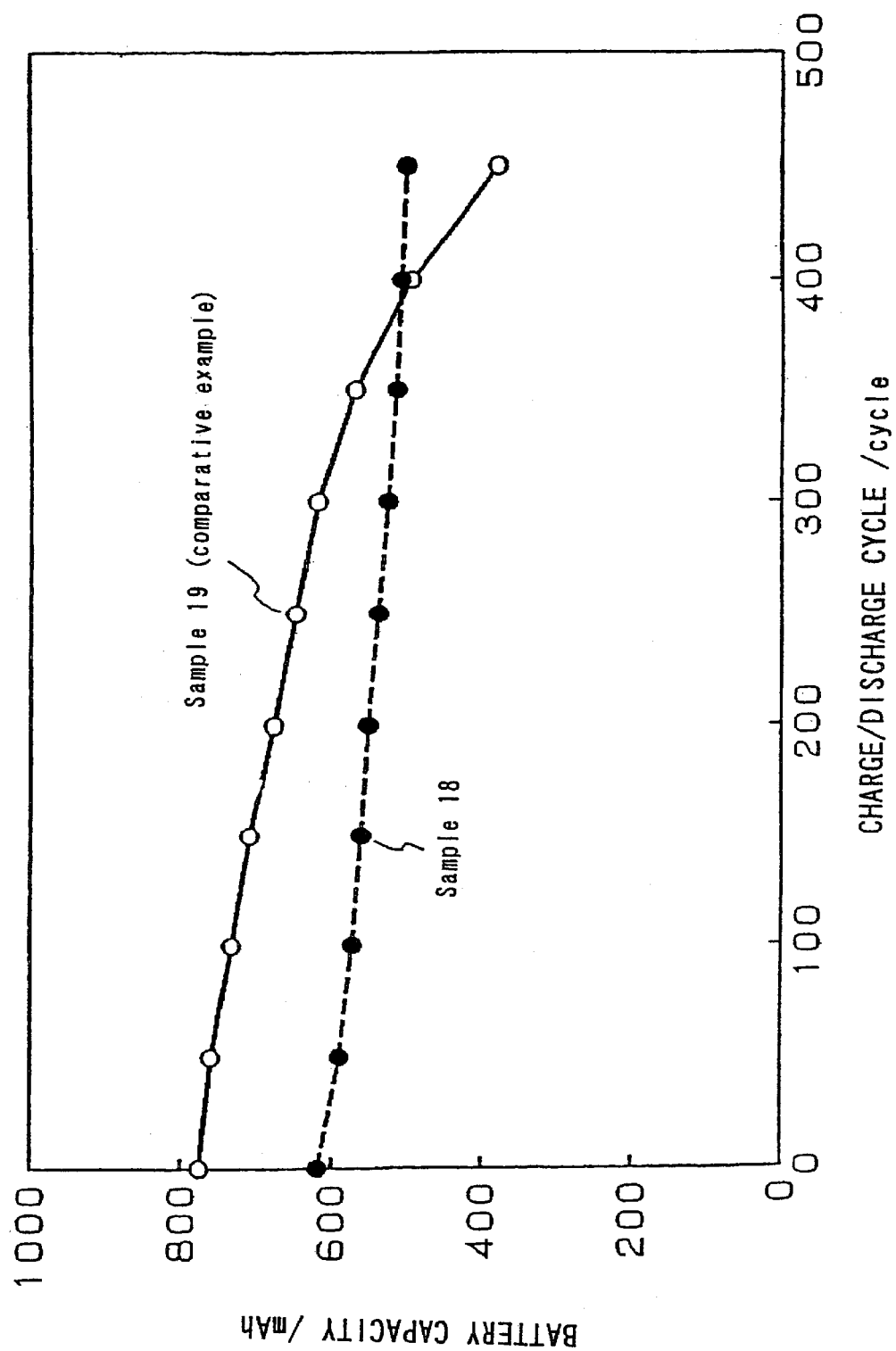
FIG. 9 is a characteristic diagram showing cycle life characteristics of secondary batteries in a still further example of the present invention.
Figure 10:
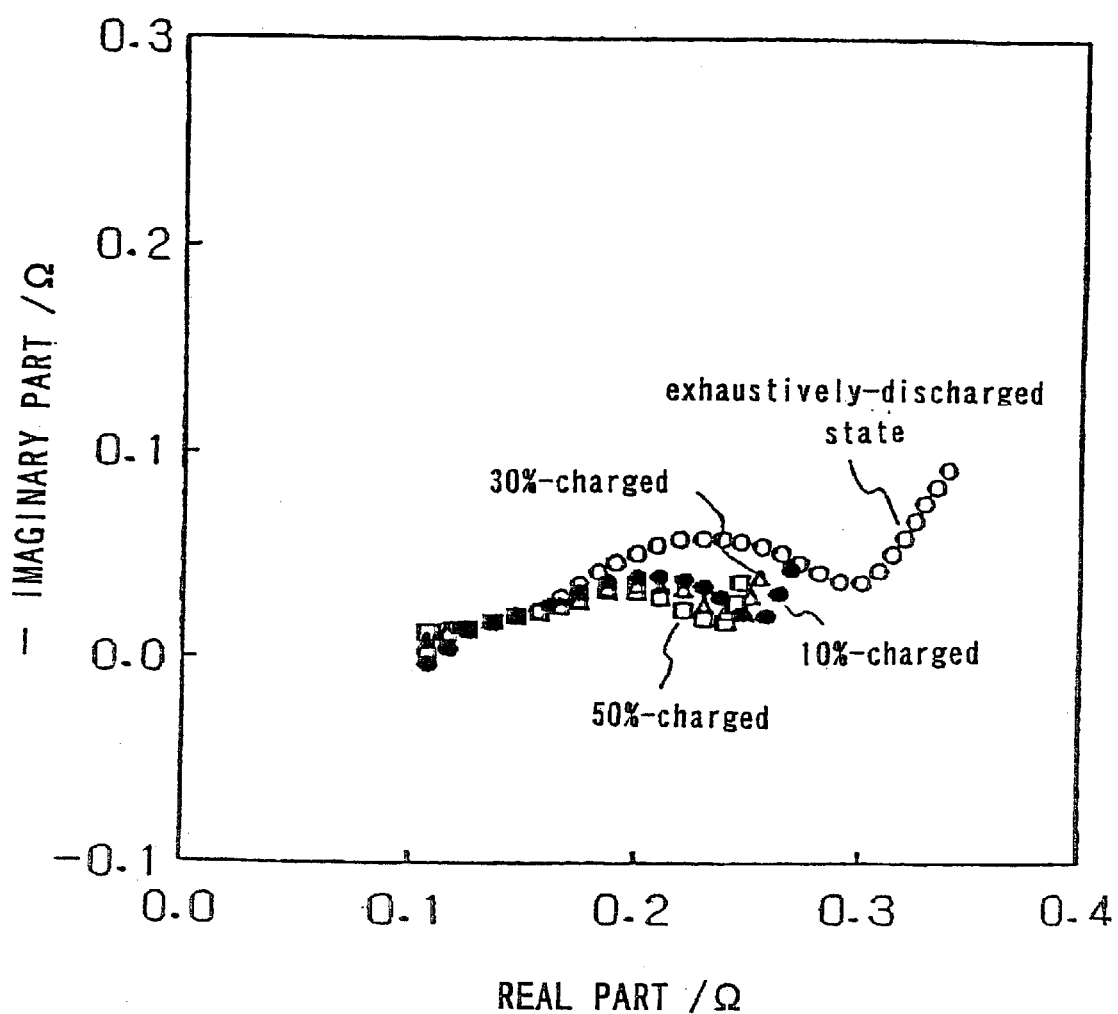
FIG. 10 is a diagram showing impedance characteristic of a lithium ion secondary battery.

The diagram in FIG. 9 shows the cycle life characteristics of the batteries of Samples 18 and 19.

The battery of Sample 18 in accordance with this example has smaller battery capacity in the early stage of the cycles than that of Sample 19 as the comparative example since battery capacity of about 20% of the rated capacity is not utilized. However, these batteries demonstrate only small deterioration in discharge capacity during the charge/discharge cycles and an excellent cycle life characteristic rather than those of Samples 15 and 16 in Example 6. In addition, the capacity becomes larger than that of Sample 19 as the comparative example with the further repetition of the charge/discharge cycles.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

We claim:

1. A method for charging a secondary battery comprising the steps of:
   detecting an impedance of said battery;
   charging said battery with a substantially constant first current having a value smaller than a predetermined current value if the detected impedance of said battery is equal to or greater than a predetermined impedance value;
   charging said battery with a substantially constant second current having a value equal to or greater than the predetermined current value if the detected impedance is less than the predetermined impedance value; and
   terminating charging said battery with said first and second constant currents when a closed circuit voltage of said battery reaches a predetermined voltage value.

2. A method for charging a secondary battery in accordance with claim 1, wherein during said constant-current charging step, the first charging current value is changed-over to the second current value when the impedance of said secondary battery or a variance rate with time thereof becomes smaller than a predetermined value.

3. A method for charging a secondary battery in accordance with claim 1 further including the step of charging said battery with a constant voltage having the predetermined voltage value after the constant current step is terminated, wherein the charging of said battery with said constant voltage is terminated before said battery is brought into a fully charged state.

4. A method for charging a secondary battery in accordance with claim 3, wherein said constant-voltage charge step of said secondary battery is terminated when an absolute value of a variance rate with time of a third current value being supplied to said battery by said constant voltage becomes smaller than a predetermined value.

5. A method for charging a secondary battery comprising the steps of:
   charging said battery with a current until a closed circuit voltage of the battery reaches a predetermined voltage value, the current having one of a first constant value and a second constant value larger than the first constant value;
   charging said battery with a constant voltage having the predetermined voltage value after the closed circuit voltage reaches the predetermined voltage value; and
   terminating the charging of said battery by said constant voltage before said battery is brought to a fully charged state wherein during said current charging step, the value of the charging current is changed from the first constant value to the second constant value when a variance rate with time of the closed circuit voltage of said battery becomes smaller than a predetermined value.

6. A method for charging a secondary battery comprising the steps of:
   charging said battery with a current having at least one value until a closed circuit voltage of the battery reaches a predetermined voltage value, the current having one of a first constant value and a second constant value, the second constant value being larger than the first constant value;
   charging said battery with a constant voltage having the predetermined voltage value after the closed circuit voltage reaches the predetermined value; and
   terminating the charging of said battery by said constant voltage before said battery is brought to a fully charged state wherein said current value is changed temporarily during said current charge step, the current value being increased from the first constant value to the second constant value when a difference ($|V_1-V_2|$) between the closed circuit voltage value $V_1$ after a lapse of time $t_1$ from the start of the charging with the current and another closed circuit voltage value $V_2$ after another lapse of time $t_2$ becomes smaller than a predetermined voltage value.

7. A method for charging a secondary battery comprising the steps of:
   charging said battery with a current having at least one value until a closed circuit voltage of the battery reaches a predetermined voltage value, the constant current having one of a first constant value and a second constant value, the second constant value being larger than the first constant value;
   charging said battery with a constant voltage having the predetermined voltage value after the closed circuit voltage reaches the predetermined value; and
   terminating the charging of said battery with said constant voltage before said battery is brought to a fully charged state wherein a temporary change in the charging current value is repeated with a predetermined interval during said current charging step, the current value being increased from the first constant value to the second constant value when a difference ($|V_1-V_2|$) between a closed circuit voltage value $V_1$ after a lapse of time $t_1$ from the start of the charging with the current and another voltage value $V_2$ after another lapse of time $t_2$ becomes smaller by not less than a predetermined voltage value.

* * * * *